(12) United States Patent
Kerridge

(10) Patent No.: US 8,616,440 B2
(45) Date of Patent: *Dec. 31, 2013

(54) ALTERNATIVE BANKING SYSTEM FOR MANAGING TRADITIONAL AND NONTRADITIONAL MARKETS

(76) Inventor: Kevin Kerridge, Oakville (CA)

( * ) Notice: Subject to any disclaimer, the term of this patent is extended or adjusted under 35 U.S.C. 154(b) by 339 days.

This patent is subject to a terminal disclaimer.

(21) Appl. No.: 11/264,791

(22) Filed: Nov. 1, 2005

(65) Prior Publication Data

US 2007/0095894 A1    May 3, 2007

(51) Int. Cl.
*G06K 7/00* (2006.01)

(52) U.S. Cl.
USPC .......................... 235/379; 235/375; 235/380

(58) Field of Classification Search
USPC ......... 235/379, 375, 380, 449, 454, 435, 439, 235/487, 493; 705/1, 16, 35–45; 902/26
See application file for complete search history.

(56) References Cited

U.S. PATENT DOCUMENTS

| | | | |
|---|---|---|---|
| 4,617,457 A * | 10/1986 | Granzow et al. .............. 235/379 |
| 5,484,988 A | 1/1996 | Hills et al. |
| 5,832,464 A * | 11/1998 | Houvener et al. ............... 705/45 |
| 6,164,528 A | 12/2000 | Hills et al. |
| 6,283,366 B1 | 9/2001 | Hills et al. |
| 7,529,710 B1 | 5/2009 | Clower et al. |
| 2002/0105665 A1 * | 8/2002 | Wasilewski et al. ......... 358/1.13 |
| 2002/0120582 A1 * | 8/2002 | Elston et al. .................... 705/64 |
| 2004/0225604 A1 * | 11/2004 | Foss et al. ....................... 705/39 |
| 2004/0236688 A1 | 11/2004 | Bozeman |
| 2005/0080697 A1 * | 4/2005 | Foss et al. ....................... 705/35 |
| 2005/0086168 A1 * | 4/2005 | Alvarez et al. .................. 705/41 |
| 2007/0080207 A1 * | 4/2007 | Williams ....................... 235/379 |

* cited by examiner

*Primary Examiner* — Michael G Lee
*Assistant Examiner* — Matthew Mikels
(74) *Attorney, Agent, or Firm* — John S. Hale; Gipple & Hale

(57) ABSTRACT

A method of exchanging a check, cash or electronic funds transfer comprises receiving a check, cash or electronic funds transfer from a presenter at a receiving entity, the check having an amount printed thereon and made by an entity other than the presenter, the electronic funds transfer made by an entity other than the presenter, establishing a card account of the receiving entity, crediting the card account of the receiving entity with an amount corresponding to the check amount, cash amount or electronic funds transfer amount, associating a card with a value corresponding to the check amount, cash amount or electronic funds transfer amount to create a stored value card, and presenting the stored value card to the presenter.

20 Claims, 10 Drawing Sheets

US 8,616,440 B2

ALTERNATIVE BANKING SYSTEM FOR MANAGING TRADITIONAL AND NONTRADITIONAL MARKETS

FIELD OF THE INVENTION

The present invention relates to a check processing method wherein check authentication and the identity of the check presenter may be verified using a data base of stored information and whereby a stored value card may be instantly issued.

BACKGROUND OF THE INVENTION

Various check verification methods are in the prior art. Some of these check verification methods are designed to be made available at point-of-sale (POS) terminals, which may be operated by a customer. Such POS terminals communicate with a remotely located transaction processor and the POS terminal may provide the information to an the Automated Clearing House (ACH) Network. The ACH Network is a highly reliable and efficient nationwide batch-oriented electronic funds transfer system governed by the National Automated Clearing House Association which provides for interbank clearing of electronic payments for participating depository financial institutions. The Federal Reserve and Electronic Payments Network act as ACH operators which are central clearing facilities through which financial institutions transmit or receive ACH entries.

Check verification is governed by the "Check Clearing for the 21st Century Act" (Check 21) which was signed into law on Oct. 28, 2003, and became effective on Oct. 28, 2004 (H.R. 1474). Check 21 is designed to foster innovation in the payments system and to enhance its efficiency by reducing some of the legal impediments to check truncation. The Check 21 law facilitates check truncation by creating a new negotiable instrument called a substitute check, which permits banks to truncate original checks, process check information electronically, and deliver substitute checks to banks that want to continue receiving paper checks. A substitute check is the legal equivalent of the original check and includes all the information on the original check.

The "Uniting and Strengthening America by Providing Appropriate Tools Required to Intercept and Obstruct Terrorism Act of 2001" (USA Patriot Act) was signed into law on Oct. 24, 2001 (H.R. 3162). Section 326 of the USA Patriot Act is entitled "Verification of Identification" and requires that financial institutions and others know their customers. This federal regulation requires financial institutions and others to implement a customer identification program. Besides verifying the identity of any person seeking to open an account, or for maintaining records of the information used to verify a person's identity, including name, address, and other identifying information, this section of the USA Patriot Act also calls for consulting lists of known or suspected terrorists or terrorist organizations provided to the financial institution by any government agency to determine whether a person seeking to open an account appears on any such list.

With the enactments of the Check 21 Act and section 326 of the USA Patriot Act, it is important to provide a check processing system that complies with the law and provides added security to financial transactions thereby reducing check fraud, money laundering and the use of money for acts of terror.

SUMMARY OF THE INVENTION

A method according to the invention may result in exchanging a check and/or cash, and may include (a) receiving a check and/or cash from a presenter at a receiving entity, the check having an amount printed thereon and made by an entity other than the presenter, (b) establishing a card account of the receiving entity, (c) crediting a card account of the receiving entity with an amount corresponding to the check amount and/or the cash amount, (d) associating a card with a value corresponding to the check amount and/or the cash amount to create a stored value card, and (e) presenting the stored value card to the presenter.

BRIEF DESCRIPTION OF THE DRAWINGS

The invention is described with reference to the drawings, in which like reference characters designate the same or similar parts throughout the drawings in which.

DETAILED DESCRIPTION OF THE INVENTION

Figure 1A:
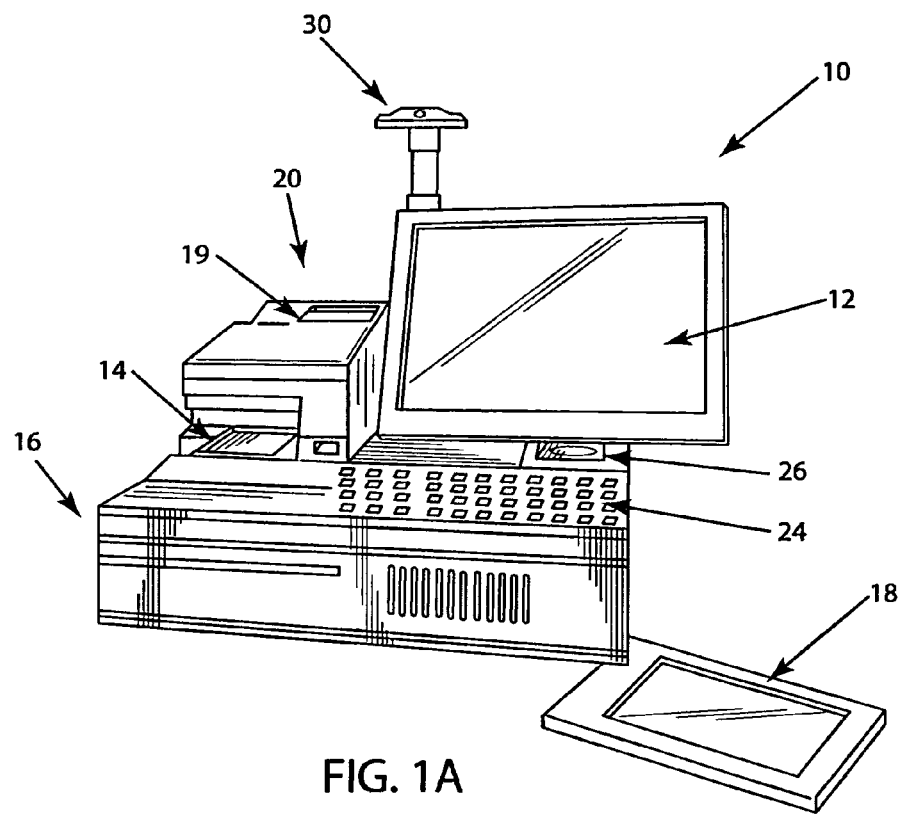
FIG. 1A shows an example of a Modular Retail Teller Terminal in accordance with the present invention.
Figure 1B:
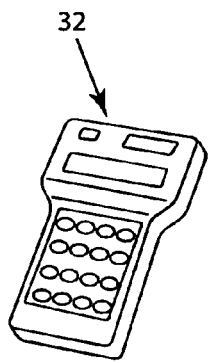
FIG. 1B shows an example of an encrypted key pad associated with the Modular Retail Teller Terminal of FIG. 1A.
Figure 1C:
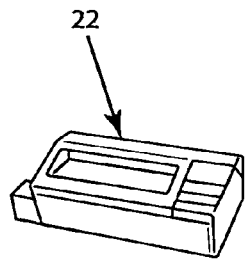
FIG. 1C shows an example of a card printer associated with the Modular Retail Teller Terminal of FIG. 1A.

In a method according to the invention a check and/or cash may be exchanged. Such a method may include receiving a check and/or cash from a presenter at a receiving entity. The check may have an amount printed thereon and may be made by an entity other than the presenter.

The receiving entity may provide a Modular Retail Teller Terminal (MRTT or MRT terminal), a bank terminal which may be operated by a teller. The MRTT may also be operated by the presenter. For simplicity, an embodiment of the invention will be described wherein a teller operates the MRTT. The MRTT may be a compact, portable device, which may be installed in banks, retail stores or other non-bank locations. The parts and arrangement of the MRT terminal will be described in greater detail below. The check presented by the presenter may be, for example, a payroll check, a government check, a personal check, or other financial instrument. Cash may also be presented at the MRT terminal. For simplicity and consistency herein, the term "check" will be used herein to represent any check or cash, as mentioned above, or any other financial instrument.

The presented check may be tested to determine the authenticity of the check. The check testing methods utilized by the present invention may comply with the Check 21 statute and will be described in greater detail below.

The check presenter may be required to authenticate his/her identity. The identity authentication methods utilized by the present invention may comply with Section 326 of the USA Patriot Act and will be described in greater detail below.

If the presented check passes the authenticity tests and is authenticated, and the identity of the presenter is authenticated, a card account of the receiving entity may be established. A card account may be a virtual account held in virtual space on a cash management program run on servers. The amount of the presented check may be credited to the card account. The card account may include an identifier that associates funds corresponding to the check with the presenter, and the account may be controlled and reconciled by an issuing bank or other financial institution. At a non-bank location, a stored value card may be issued to the presenter that has an amount, up to and including the check amount, associated with it. The amount associated with the card is debited against a virtual cash management system reconciled against a card account held at a bank and processed by a third party. Alternatively, the card account may be a corporate pooled account held by an issuing bank or other financial institution, from which funds to be associated with the stored value card may be deducted. The MRTT system and virtual cash management system may act as a remote branch of a bank or other financial institution. If a bank runs the MRTT itself, a bank account may be opened for the presenter. The card to be issued to the presenter may be associated with the individual bank account instead of a corporate pooled account.

The card account of the receiving entity may be credited with an amount corresponding to the check amount. A card may be associated with a value corresponding to the check amount. The card account of the receiving entity may be debited by an amount corresponding to an amount up to and including the check amount, when the stored value card is used by the presenter. The stored value card may have limits associated with it, such as a debit card, gift card, prepaid card, bank account passbook, secured credit card, or other type of plastic card. The stored value card may be any type of card having any type of storage device associated with it. For example, the card may be a plastic card having a magnetic stripe on the back of the card. The card may also be a "smart card" having a memory chip on the surface of the card or embedded within the card. The card may also have a combination of the magnetic stripe and memory chip. The card may also be a voucher, such as a paper voucher, having a unique identifier associated with the voucher. Other types of cards having storage devices may also be used. For simplicity and consistency herein, the term "card" will be used to represent any stored value card as mentioned above. The card may be created at the. MRT terminal and issued to the presenter. Payment of the check may be requested by the financial institution through known methods. Transactions at the MRT terminals may be real time transactions.

Once the card has an amount associated with it, the card may be used by the customer (presenter) much as a normal debit card might be used. That is, it can be used virtually anywhere, for example, at ATM's (automated teller machines), to purchase items in retail settings, to pay bills, to purchase gasoline, etc.

The amount associated with the card may be an amount up to and including the amount printed on the check. Some or all of the funds may be withheld from the presenter and kept in the receiving entity account until the presented check is cleared through known methods. The funds withheld may also be released over a period of time. For example, the first time a customer presents a check at the MRTT, 80% of the check amount may be withheld for a period of time. The amount the check which may be withheld at a subsequent transaction may be less than that of the first transaction. After the customer is known, i.e. a repeat customer, the entire check amount may be associated with the card at the time a check is presented. By doing so, the receiving entity may recognize greater security, prevent check fraud, and establish the identity of the presenter.

As noted above, the check may be tested to verify its authenticity. The check may be imaged and truncated in accordance with the Check 21 statute. The original paper check may be scanned using a scanner (14 of FIG. 1A). The MICR (magnetic ink character recognition) line appearing at the bottom of the check may be read. The MICR line may include the bank routing number, account number, check number, and other information which may be printed in magnetic ink in accordance with generally applicable industry standards.

The check writer (e.g., employer) information may be scanned and captured, for example using optical character recognition (OCR). The signature of the check writer (e.g., payroll clerk) may be captured electronically. A verification of the check writer may be made using the foregoing information. The presenter endorsement on the back of the original paper check may be captured electronically. These processes may be used to create a substitute check which is an electronic image of the original check in compliance with the Check 21 statute.

The image of the check may be stored (archived) in a data base for future retrieval, use and comparison. Information relating to establishing the card account may be stored in an electronic journal within the main servers, and accessed at a later date by a teller or via the Internet by the presenter. All account transactions related to the card account and/or the card, be they at the MRTT, an ATM or a POS terminal, may be recorded for future reference. This may help security of the system/method, help establish the identity of the presenter, and/or this information may be used to verify the identity of a returning presenter. Retrieval of previously stored presenter and transaction information may result in fewer errors by a teller in a later transaction, because the information may automatically be retrieved.

The MRTT may print a receipt using the receipt printer (19 of FIG. 1A) and thereby make a record of the transaction. A record of the transaction may be made in an electronic journal.

Also as noted above, the identity of the check presenter may be authenticated through a series of tests. For example, when presenting a check at an MRT terminal, the presenter may be asked to provide one or more forms of identification, e.g., driver's license, social security number or card, work visa card, military identification card, student identification card, other bank card, or other acceptable forms of identification. The identification may be scanned, and the information used to populate a data base. The data base information may be used, for example to facilitate processing of a check. The data base may store information regarding accounts, amounts deposited, and amounts withdrawn. This protects against fraud by sharing account information with, for example, other banks and savings and loans.

An image of the presenter may be obtained at the MRT terminal using a digital camera (30 of FIG. 1A) installed at the terminal. The image may be stored for later use, for example, as a first line of defense against check fraud and money laundering. If the teller notes that the presenter does not physically match the stored image of the person the presenter claims to be, then the transaction may be immediately terminated. A closed loop biometrics system may also be employed to identify the client. Biometrics that may be used include fingerprints, facial recognition, voice analysis, but others may be utilized to identify the presenter. A closed loop biometric system may use biometric information on a card and compare the biometric information encoded on the card to a biometric specimen taken from the presenter, in order to enhance security of the card. For example, a fingerprint of the presenter may be captured using a fingerprint scanner (34 of FIG. 1D), digitized and recorded on the storage device associated with the card and compared to a fingerprint taken from the presenter by the MRTT.

In an embodiment of the invention, an electronic funds transfer (EFT) may be transmitted by a third party to a corporate pooled account of the receiving entity. The EFT may also be a payroll direct deposit transmitted to the receiving entity by a third party. For an EFT to be transmitted to the receiving entity, a card account must have been previously created for the customer. The card account may be credited with an amount corresponding to the EFT amount. An existing stored value card may be associated with an amount corresponding to an amount up to and including the EFT amount.

In an embodiment of the invention, no paper checks need to be issued to the presenter, and no credit or loans need to be issued to the presenter, and the amount associated with the card may be withdrawn from the card account associated with that particular presenter.

Other financial products may be offered at the MRTT including auto leasing, life insurance, prepaid products such as cell phones, home phones, internet, DVD, music or reference CD services, bill payment, preauthorized payments for reoccurring bill payment such as utilities, insurance, gas, road tolls, etc.

The system may also be used in other applications as a device for collecting information for security or pharmacy/drug distribution purposes. The system may also be used to produce a personal identification card. Documents other than checks may also be scanned, imaged and collected in a data base for comparison and management.

The following describes an example of a method by which a third party check may be processed, loaded to a card account, and associated with a card. The method is described with reference to an MRTT 10, shown in FIG. 1A-1D. A check may be presented to a teller (not shown), who operates the MRTT 10. Having a teller operate the MRTT may add to the security of the transactions. It should be noted, however, that a presenter may also operate the MRTT directly, in much the same way as a teller may operate the MRTT. The MRTT may be easy to use and may include a GUI (Graphical User Interface) to make the MRTT user-friendly. A touch-screen monitor 12 may be included in the MRTT for ease of use. The touch-screen monitor 12 may include multiple screens corresponding to different financial packages. Voice prompts may also be utilized to guide the teller through transactions.

The presented check may be scanned by a scanner 14 and imaged. The scanned image may be sent to a data base for electronic presentment complying with the Check 21 statute. For example, the data base may be hosted on servers held on a secure cash management platform. The result may be a reduction in paper check handling and/or processing, which may save the customer and financial institution time and money.

The MRT terminal may also have a card reader 16, signature capture pad 18, receipt printer 19, ID scanner 20, bar code reader (not shown) card printer 22, encrypted key pad 32, and biometric fingerprint scanner 34. These may be serially connected or they may be connected via USB (universal serial bus). The MRT terminal may also have a cash drawer (not shown), keyboard 24 and mousepad 26. There may also be a POS system associated with the MRTT. It is anticipated that in most applications there may not be a POS system associated with the MRTT. At locations where an MRTT is installed, an ATM that dispenses cash may be located proximate to the MRTT in order to allow the recipient of a card to quickly obtain cash. As previously noted, a digital camera 30 or biometric device 34 may also be associated with the MRTT.

The customer information may be captured and sent to the client management data base (CMD). The information in the CMD may be used to authenticate a check and/or set withdrawal limits for a customer. For example, the information stored in the data base may verify that the bank issuing the check exists, that a bank account of the check issuer exists, that the MICR line numbers match e.g., correct branch/transit number, that the account number is associated with that branch, and/or that the address of the bank is correct. The front of the check may be scanned and OCR software may read the printed check and convert it to data. The image of the signature on the check of the payroll clerk and the image of the signature of the endorser on the back of the check may be captured, and stored in the CMD. A third party check authorization module may also be used to verify the authenticity of a check and to perform tests (audits) on a personal check that may be presented.

The check image and a record of each transaction may be stored in the CMD. The CMD may be self-populating, without the need to manually indicate that information should be stored in the CMD, so each time a transaction occurs, more information may be stored in the CMD. Over time, a large amount of information pertaining to each customer may be stored and available for retrieval. The CMD may also include negative data base information supplied by third parties. This information may include credit reports and ratings, lists of terrorist suspects, bank account scoring, or other types of information If the check is verified, for example, there are no negative hits from the CMD, the check may be held until the presenter is identified and an account of the receiving entity is established. Thereafter the check may be sent for processing and payment by the financial institution, which may be undertaken through known methods.

The CMD may be used to verify the identity of the presenter. Information provided by the presenter may be used to populate the CMD. For example, the name, address, telephone numbers, and employer name and address may be entered at the MRTT and populate the CMD. The presenter's social security number and driver's license number, or other identification card, may be scanned and this information may populate the CMD. In an embodiment of the invention, this information need only be entered at the MRTT the first time the presenter requests a transaction at the MRTT. Thereafter a card presented at the MRTT may be used to initiate the system and recall information pertaining to the card account previously stored in the CMD.

An image of the presenter may also be obtained using a digital camera 30. Using facial recognition software, a comparison may be made against a data base of images to act as a defense against check fraud. Optionally, a fingerprint or other biometric information may obtained for use in identifying the presenter. For example, biometric information that may be recorded on the card may be compared to a fingerprint of the presenter taken at the MRT terminal, using fingerprint scanner 34, when the presenter initiates a transaction at the MRT terminal.

After the check is verified and the identity of the presenter is confirmed by the CMD, the card may be printed by the card printer 22. An image of the presenter may also appear on the card, adding to its security. Biometric information may also be encoded on the card, adding to its security.

A card in the form of a paper voucher may also be printed at the receipt printer 19. The voucher may be used in much the same way as a debit card or other card. The voucher may be used at a POS terminal having the appropriate software and being connected to the Internet, or the voucher may be used for purchases by the customer via the Internet. The unique identifier associated with the voucher, such as a series of numbers, is entered into the POS terminal or via personal computer. A PIN number previously associated with the voucher is also entered into the POS terminal or computer. The desired transaction may then be completed.

Time limits for use may be placed on the card. For example, the card may be canceled after a period of non-use, or an expiry date may be set for using the card. It may also be desirable to set time limits in case the card is lost or stolen, or for other reasons.

Withdrawal limits may also be placed on the account. For example, if a sub-account for a family member (discussed below) is created, a customer may wish to have a daily withdrawal limit placed on the card. It may also be desirable to set withdrawal limits in case the card is lost or stolen, or for other reasons.

A third party check authorization module may be used to verify the authenticity of a check and to perform tests (audits) on a personal check that may be presented. Use of the third party check authorization module may be minimized by use of one or more of the above-described protective measures. It is believed that when regularly used, the CMD may include enough information to be highly valuable to and used by many banks and other financial institutions for obtaining information on a customer or prospective customer. A third party check guarantor may also be used to guarantee payment of all checks or to perform random audits of presented checks.

Figure 2A:
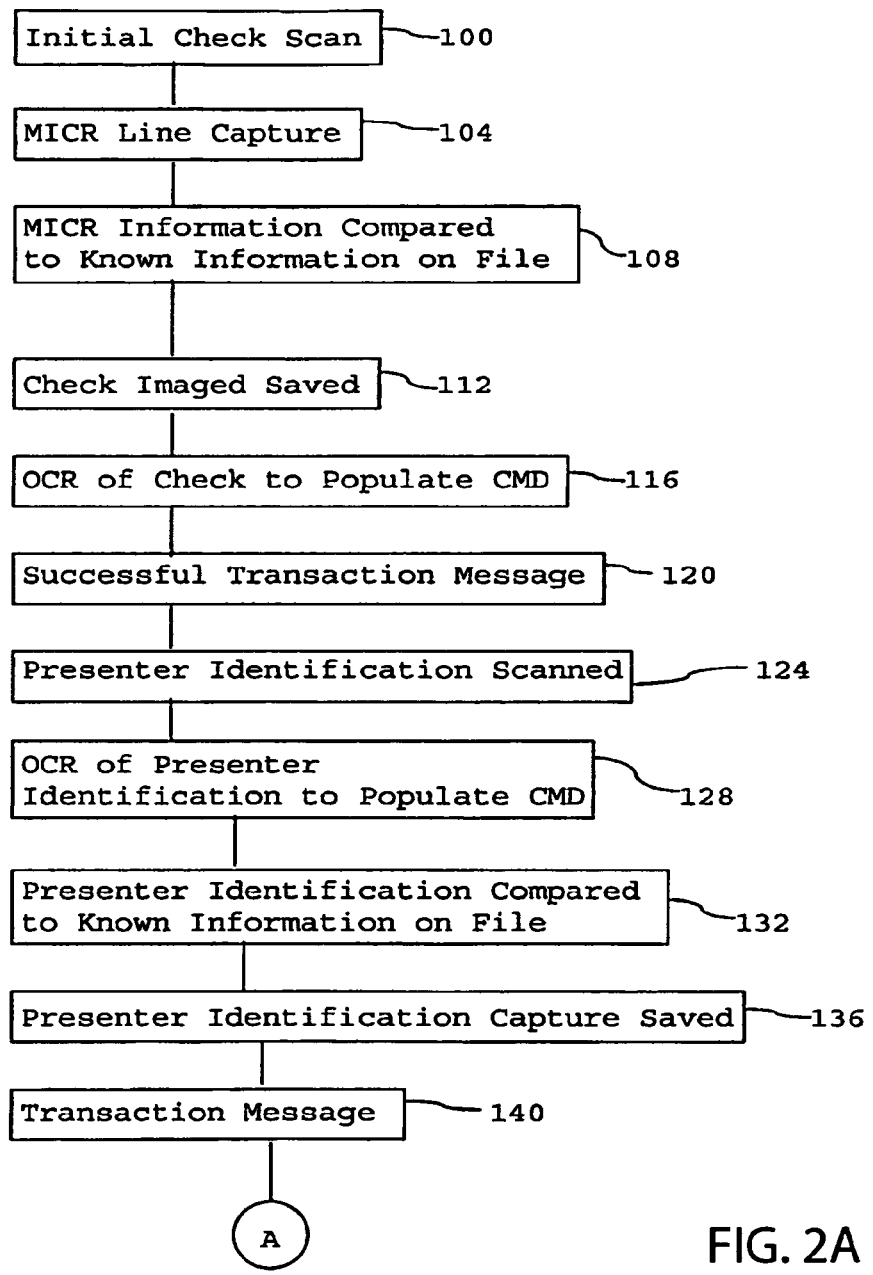
FIG. 2A is the first portion of a flow chart of a process according to the invention whereby a check is presented and a card account is established.
Figure 2B:
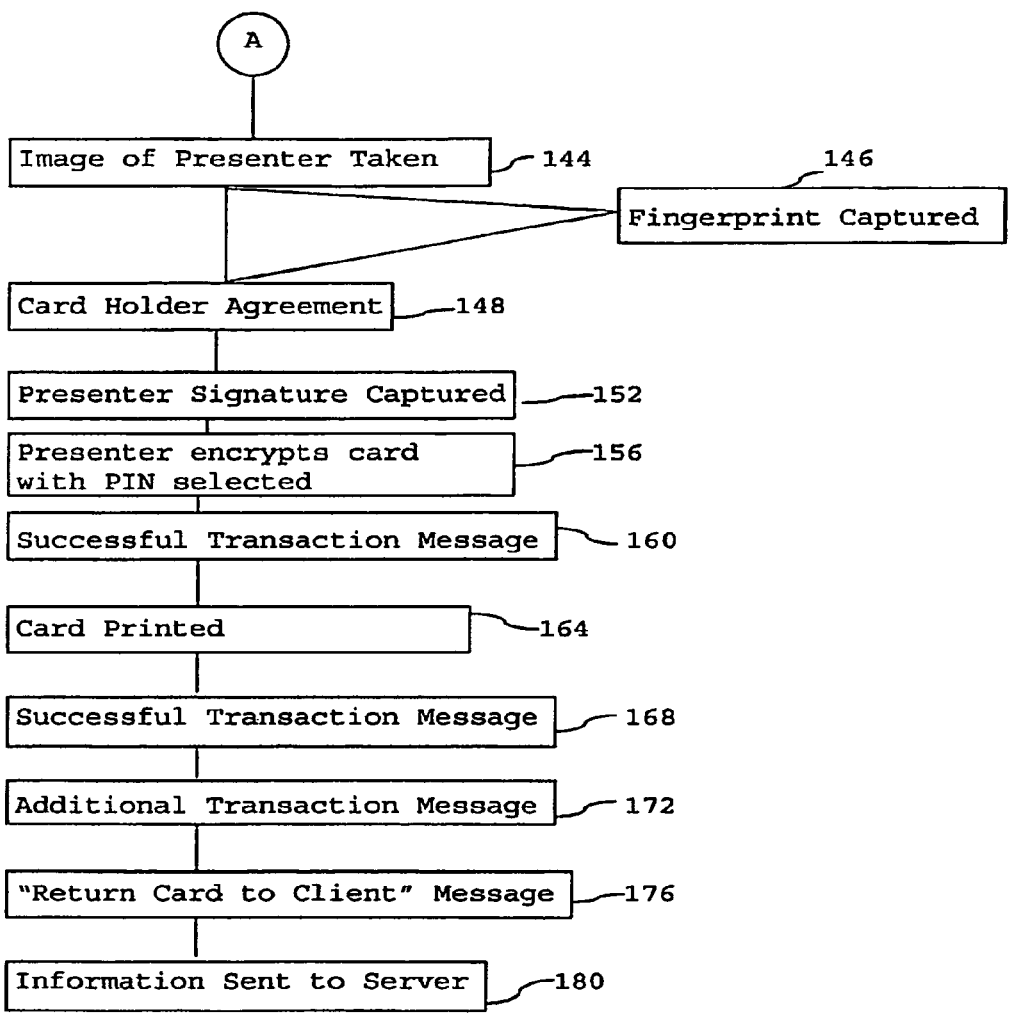
FIG. 2B is the second portion of the flow chart of FIG. 2A after the check is presented showing establishment of a card account.
Figure 2C:
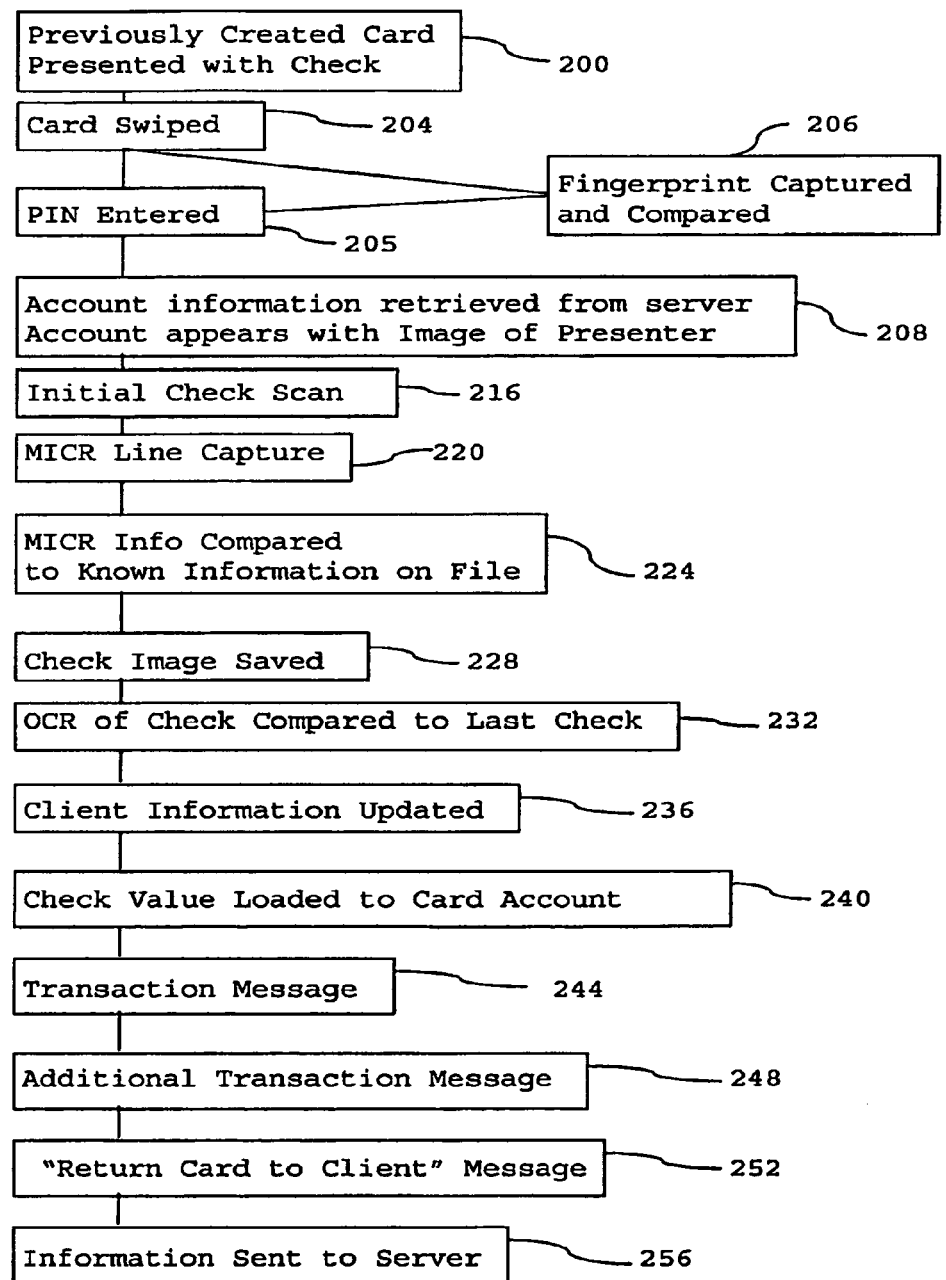
FIG. 2C is a flow chart of a process according to the invention whereby a check is presented to reload an existing card account.
Figure 2D:
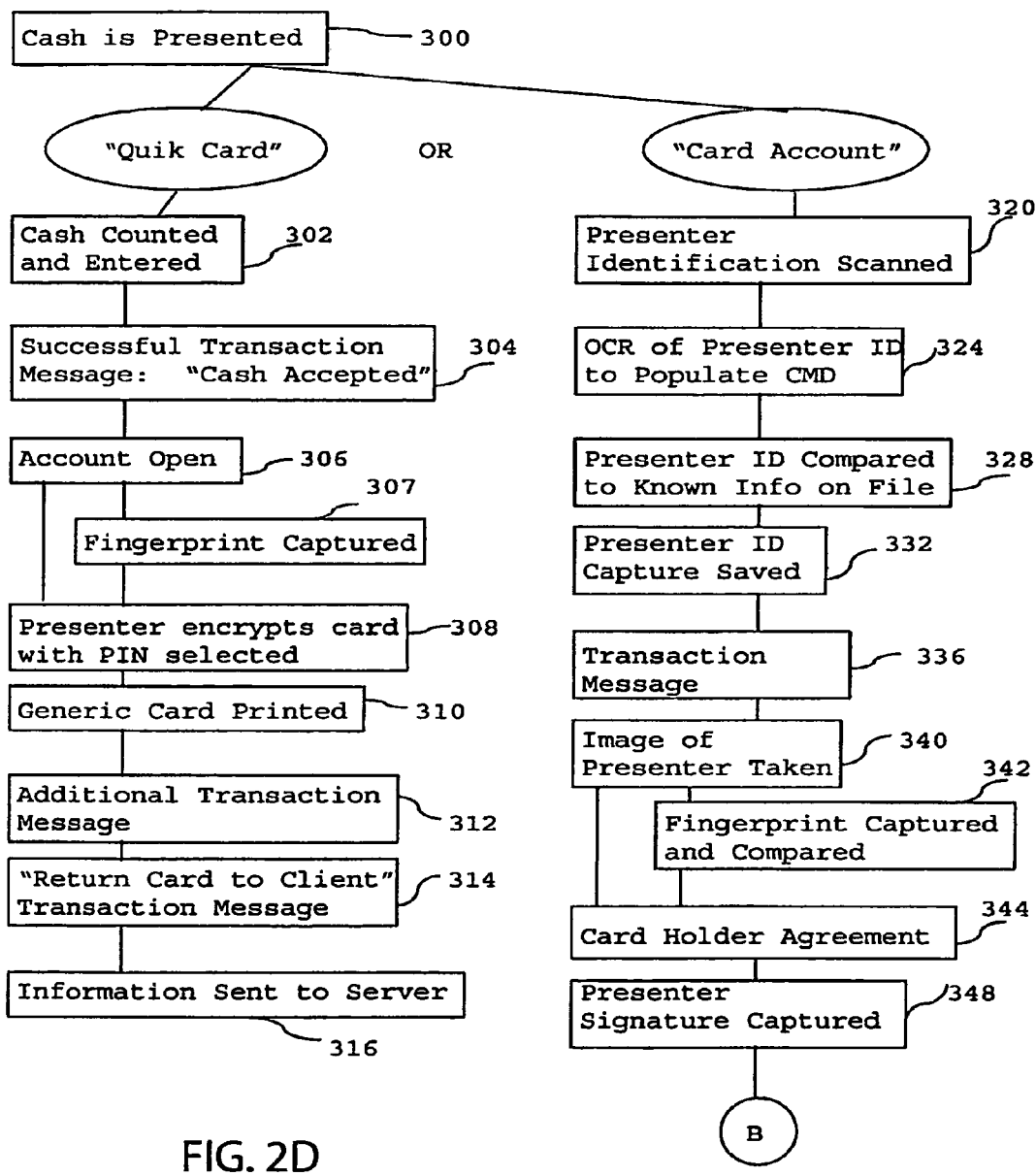
FIG. 2D is the first portion of a flow chart of a process according to the invention whereby cash is presented and a card account is established.
Figure 2E:
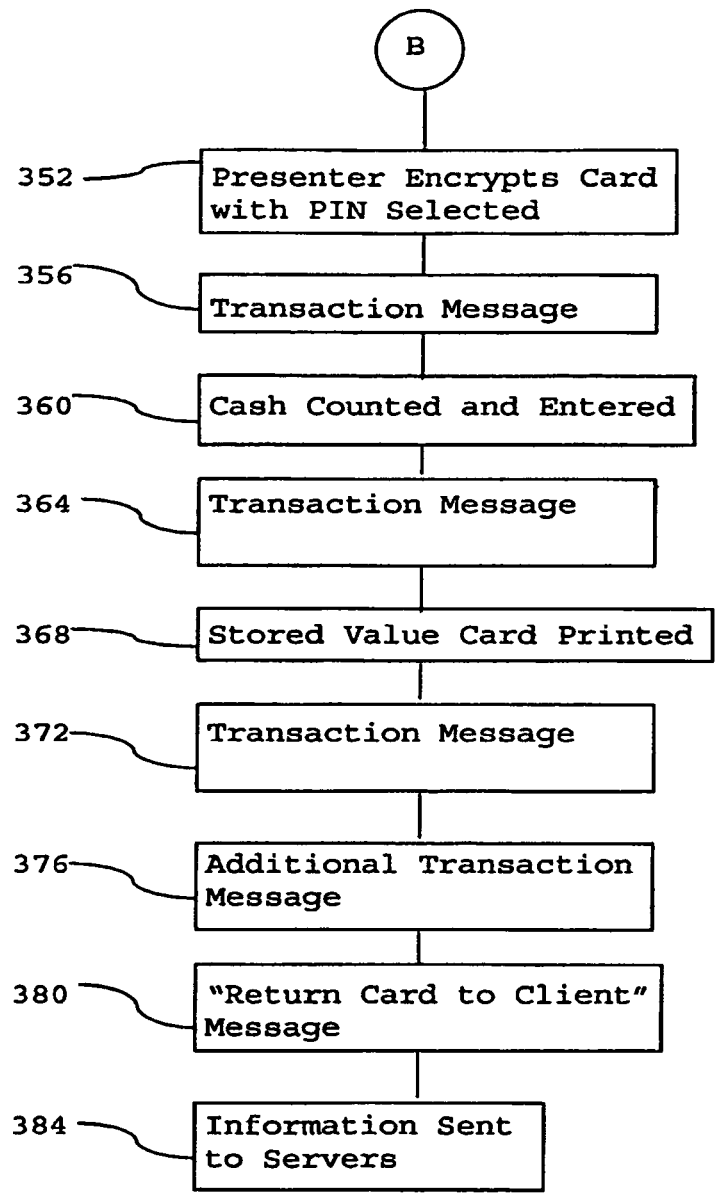
FIG. 2E is the second portion of the flow chart of FIG. 2D.
Figure 2F:
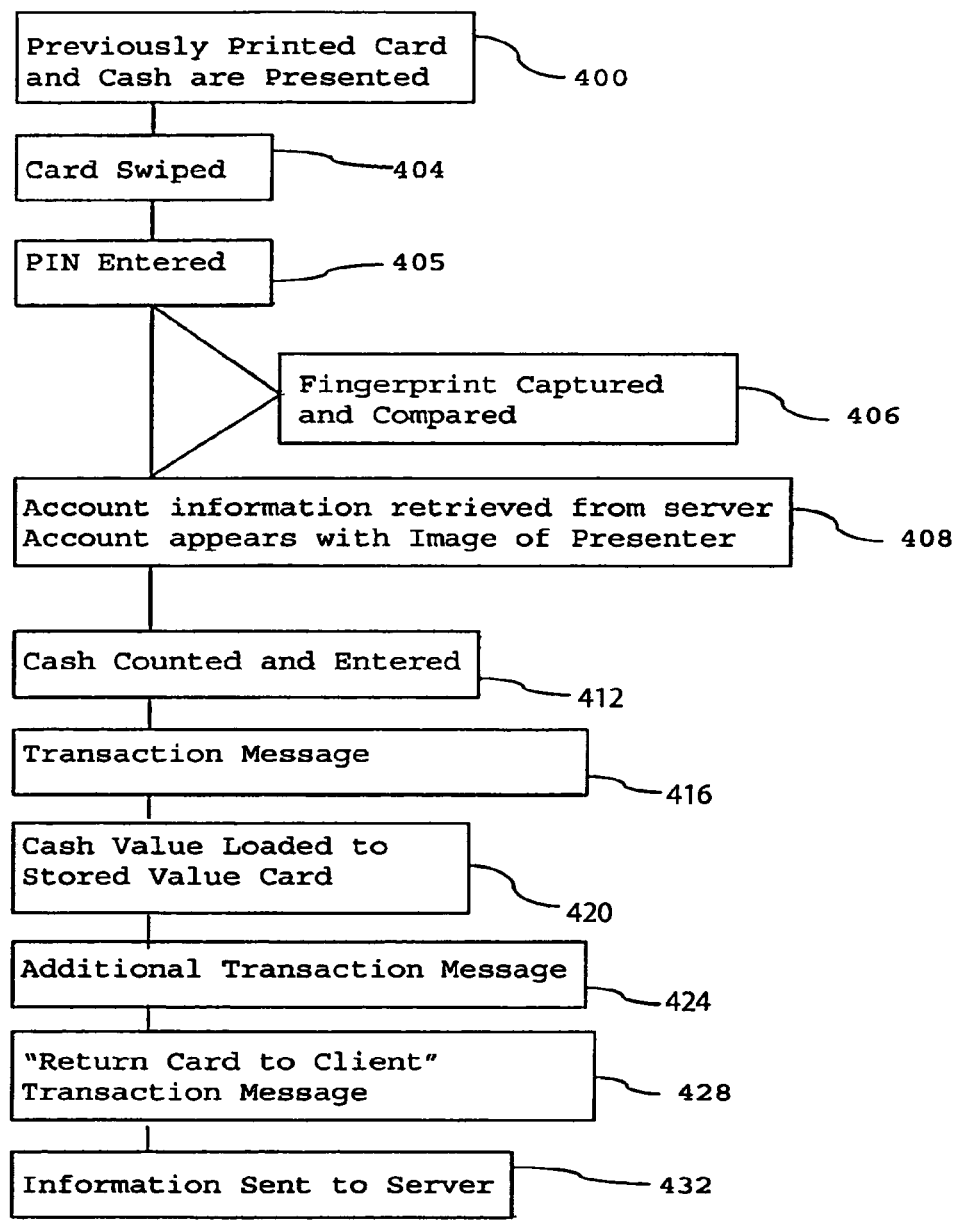
FIG. 2F is a flow chart of a process according to the invention whereby cash is presented to reload an existing card account.
Figure 2G:
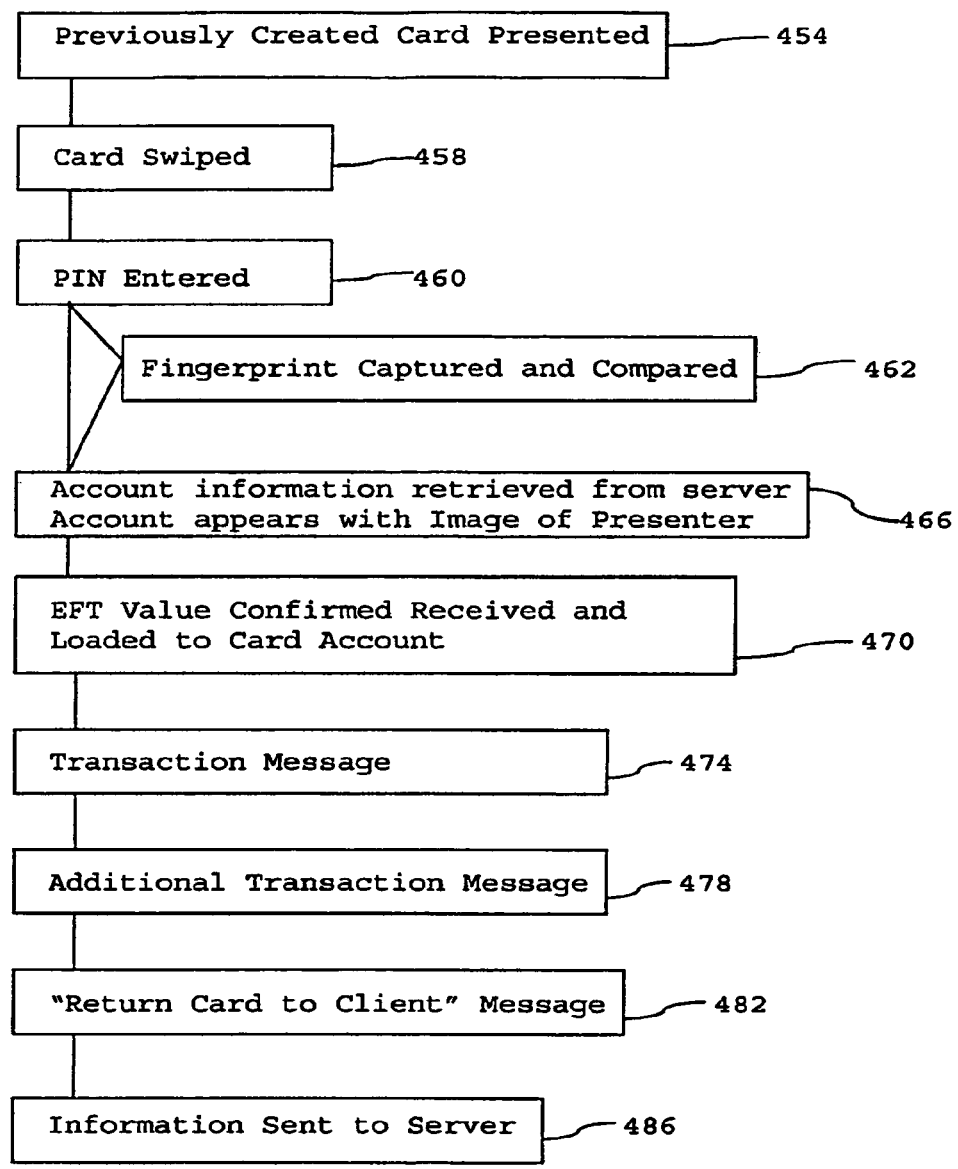
FIG. 2G is a flow chart of a process according to the invention whereby an electronic funds transfer is processed to reload an existing card account.

Four methods of processing a check or cash, the verification processes, and the ultimate issue of a card are shown in FIGS. 2A-2G and are described in detail below. A fifth method of processing an electronic funds transfer (EFT), the verification processes, and confirmation of the EFT value loaded to the card account, is shown in FIG. 2G and is described in detail below.

Referring to FIGS. 2A and 2B, a first process is shown wherein a presenter presents a check for the first time to open a new card account.

The MRTT may have virtual buttons appearing on a touch-screen monitor corresponding to each transction that may be requested by the presenter. For example, the MRTT may have virtual buttons labeled as "Load Check", "Load Cash" or "Check & Cash". If a presenter presents a check, the MRTT teller may select the "Load Check" option. If the presenter presents cash, the MRTT teller may select the "Load Cash" option. If the presenter presents a combination of a check and cash, the MRTT teller may select the "Check & Cash" option. The button for "Check & Cash" may utilize an on-screen cash entry screen.

As shown in FIG. 2A, if a check is presented, the check may be scanned (step 100). This initial check scan step may act to initialize the system without the need for the teller to select one of the above-noted virtual buttons appearing on the touch-screen monitor.

When the check is scanned, the MICR line may be read and captured (step 104). The MICR line information may then be compared to known information already on file (step 108). The CMD may then be populated with the information retrieved from the MICR line. This information may be used in future transactions for comparison. At this step, the account may be rated, i.e., the status of the account may be reviewed as to whether the account is open or closed, whether there were previous problems with the account, whether there are sufficient funds, and/or whether the customer associated with the account is deceased.

After reading the MICR line and comparing the information stored in the CMD, if no negative information pertaining to the presented check or the account is found, then the image of the check may be stored (step 112). The stored check image may be used for future account activity reporting, website retrieval by the customer, or used in case of a customer dispute.

The check may be read using OCR software and converted to data to populate client information fields of the CMD (step 116). In the case of a payroll check, the employer name, address and telephone number may be stored. In the case of a government check, the government department or type of check (e.g., social security check, disability benefit check, etc.) information may be stored. In the case of a personal check, the name, address and telephone number of the check writer may be stored. If the check is verified by the CMD then a successful transaction message, such as "Check Cleared" or "Scan Client ID", may appear (step 120) on the touch-screen monitor of the MRTT.

Next, the teller may scan the presenter's identification (step 124). Examples of acceptable forms of identification may include a driver's license, social security card, work visa card, military identification card, credit card, or other bank card. The presenter's identification may be read using OCR software and converted to data to populate client information fields of the CMD (step 128). Missing information may be entered manually by the teller at the MRTT. The presenter's identification may then be compared to known information already on file (step 132). The presenter's identification may be compared against a third party check authorization data base which may check the validity of the account. The presenter may be thereby graded for withdrawal capabilities, or flagged for deposits capabilities. If the presenter is positively identified, e.g., no negative hits were found by the data base, then the identification may be saved in the CMD (step 136). A transaction message, such as "Client ID Cleared" or "Photograph Client", may then appear on the touch-screen monitor of the MRTT (step 140).

As shown in FIG. 2B, a digital image of the presenter may be captured (step 144). A live feed from the digital camera to the touch-screen monitor may be utilized in order to provide the image on the monitor. There may also be a virtual trigger button on the monitor for ease of use of the camera.

A digital fingerprint of the presenter may be captured (step 146). The presenter may place his/her finger on a fingerprint scanner. The image of the fingerprint may be digitized and encoded on the storage device associated with the card. There may also be a virtual trigger button on the monitor for ease of use. Other biometric devices may also be used.

Figure 1D:
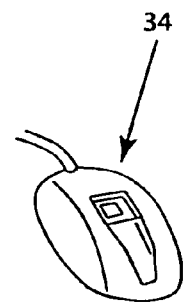
FIG. 1D shows an example of a biometric fingerprint device associated with the Modular Retail Teller Terminal of FIG. 1A.

A client card holder agreement may be printed at the MRTT (step 148) by the receipt printer (19 of FIG. 1A). The agreement may be reviewed by the presenter, and if acceptable, may be signed by the presenter. The signed agreement may then be scanned at the MRTT (step 152), for example, in much the same way as the original check is scanned and the image of the signature may be captured and stored in the CMD. The signature of the presenter may be captured by a signature capture pad (18 of FIG. 1A) provided at the MRTT. Alternatively, the presenter may review the card holder agreement and then sign directly on the signature capture pad. The image of the signature may be added to the card holder agreement and the entire agreement printed and provided to the presenter.

The presenter may encrypt the card with a personal identification number (PIN) (step 156), using, for example, an encrypted key pad (32 of FIG. 1B) provided at the MRTT. A transaction message, such as "Card is PINed", may then appear (step 160) on the touch-screen monitor of the MRTT.

If the above steps are successful, the value of the check, or a portion thereof, may be associated with a card. A card account may be loaded with the check value and the card associated with the card account may be printed at the MRTT (step 164) to create a stored value card. The card may include the presenter's image, signature and biometric information. Since an MRTT may be located in retail settings, the host store's advertising may also be provided on the card. Transaction messages, such as "Check loaded to Card Account" and "Card Printed", may appear (step 168) on the touch-screen monitor of the MRTT.

A further message may appear (step 172) on the touch-screen monitor of the MRTT, such as "Any other transactions today?". At this point, the presenter may purchase money orders, make bill payments, create a family card account, or perform other transactions. A plurality of "family" accounts, or subsidiary accounts,. may be opened for a customer under the primary card account. The information from the primary card may be transferred to a family member card which may be printed at the MRTT. A family member card may be a generic card and need not contain an image of the customer. However, a PIN number may be selected for each family member card.

When all transactions are completed, a message may appear (step 176) on the touch-screen monitor of the MRTT, such as "Return Card to Client" or "Thank You for Your Business". The card may then be provided to the presenter. Information obtained during the transaction may be finalized and sent to the servers (step 180). At this point, the card may then be available for use at an ATM or a POS terminal.

Referring to FIG. 2C, a second process is shown wherein a presenter has previously presented a check to the MRTT teller and a card account has previously been created. In this method, the presenter presents a new check to the MRTT teller to reload the existing card account.

The customer's previously printed card may be presented (step 200) to the MRTT teller. The customer may also present a check to the teller, the value of which may be loaded to the card account and associated with the card. The teller may then select the appropriate action, such as "Load Check" or "Load Cash" or "Check & Cash". The card may be swiped (step 204) through a standard magnetic stripe reader provided at the MRTT, or the unique identifier associated with the card may be entered using the keyboard 24 of the MRTT. The presenter may enter the PIN (step 205) previously associated with the card. A fingerprint of the presenter may be captured (step 206) and compared to the digital fingerprint encoded on the card. The account information previously associated with the presenter's card may be retrieved from the servers (step 208). For security purposes, the presenter's image may be retrieved from the CMD and may appear on the touch-screen monitor of the MRTT.

The check may be scanned. At this initial check scan (step 216), the check may be compared to the last check presented by the customer. At this point, the presented check may or may not match the last known check presented by the customer. When the check is scanned, the MICR line may be read and captured (step 220). The MICR line information may then be compared to known information already on file (step 224). The CMD (data base) may then be populated with the information retrieved from the MICR line. This information may be used in future transactions for comparison. At this step, the account may be rated, i.e., the status of the account may be reviewed as to whether the account is open or closed, whether there were previous problems with the account, whether there are sufficient funds, and/or whether the customer associated with the account is deceased.

After reading the MICR line and comparing the information stored in the CMD, if no negative information pertaining to the presented check or the account is found, then the image of the check may be stored (step 228). The stored check image may be used for future account activity reporting, website retrieval by the customer, or used in case of a customer dispute.

The check may be read using OCR software and converted to data (step 232). This data may be compared to the last known check presented by the customer. If client information fields need to be updated (step 236), the teller may be allowed to manually enter the information at the MRTT. If the check is verified by the CMD, the value of the check, or a portion thereof, may be loaded to the existing card account (step 240) and associated with the card. A transaction message, such as "Check Loaded to Card Account", may appear (step 244) on the touch-screen monitor of the MRTT.

A further message may appear (step 248) on the touch-screen monitor of the MRTT, such as "Any other transactions today". At this point, the presenter may purchase money orders, make bill payments, create a family card account, or perform other transactions.

When all transactions are completed, a message may appear (step 252) on the touch-screen monitor of the MRTT, such as "Return Card to Client" or "Thank You for Your Business". The card may then be returned to the presenter. Information obtained during the transaction may be finalized and sent to the servers (step 256). At this point, the card may then be available for use at an ATM or a POS terminal.

Referring to FIGS. 2D and 2E, a third process is shown wherein a presenter presents cash to the MRTT teller to create a new card account.

As shown in FIG. 2D, cash may presented (step 300) to the MRTT teller, who may select a "Load Cash" button appearing on the MRTT's touch-screen monitor. The MRTT teller may be given the option to create a "Quik Card" that does not have any customer information associated with the card. A second option for the MRTT teller may be to create a card account that has the customer's identification associated with the card. This will be discussed in greater detail below.

A "Quik Card" may be created, as an example, if $500 or less in cash in presented. If a "Quik Card" is to be created, the teller may count the cash and enter the amount (step 302) onto the MRTT's touch-screen monitor. A transaction message, such as "Cash Accepted", may then appear (step 304) on the MRTT's touch-screen monitor. At this point, the cash drawer of the MRTT may open and the cash may be placed in the cash drawer. The MRTT may also monitor the amount of cash received. This may trigger a flag, for example, on the touch-screen monitor indicating that an amount of cash should be removed from the cash drawer for deposit.

An account may be created (step 306) for the presenter to which the value of the cash may be credited. The account is associated with a card number and a card may be printed. A fingerprint of the presenter may also be captured, digitized and encoded on the storage device associated with the card (step 307).

The presenter may encrypt the card with a PIN number to be associated with the card (step 308). The value of the cash may be associated with the card and a stored value card printed at the MRTT (step 310). This stored value card may be a generic card and need not include the presenter's image or signature. A message may appear (step 312) on the touch-screen monitor of the MRTT, such as "Any other transactions today?". At this point, the presenter may purchase money orders, make bill payments, create a family card account, or perform other transactions.

When all transactions are completed, a message may appear (step 314) on the touch-screen monitor of the MRTT, such as "Return Card to Client" or "Thank You for Your Business". The card may then be provided to the presenter. Information obtained during the transaction may be finalized and sent to the servers (step 316). At this point, the card may be available for use at an ATM or a POS terminal.

The second option that the MRTT teller may have is to create a card account that has the customer's identification associated with it.

In this variation of the method, the customer may present cash in any amount to the MRTT teller. The customer also may provide identification to the teller. Examples of acceptable forms of identification may include a driver's license, social security card, work visa card, military identification card, credit card, or other bank card. The teller may scan the presenter's identification (step 320). The presenter's identification may be read using OCR software and converted to data to populate client information fields of the CMD (step 324). Any missing information may be entered manually by the teller via the MRTT. The presenter's identification may be compared (step 328) to known information already on file. The presenter's identification may be compared against a third party check authorization data base which may check the validity of the account. The presenter may thereby be graded for withdrawal capabilities, or flagged for deposits capabilities.

If the presenter is positively identified, i.e., no negative information pertaining to the presented identification or a previous account is found, then the identification may be saved in the CMD (step 332). A transaction message, such as "Client ID Cleared" or "Photograph Client", may then appear (step 336) on the touch-screen monitor of the MRTT.

A digital image of the presenter may be captured (step 340). A live feed from the digital camera to the touch-screen monitor may be utilized. There may also be an on-screen camera trigger button for ease of use of the camera. The successful image can then be shown on the monitor. A fingerprint of the presenter may also be captured, digitized and encoded on the storage device associated with the card (step 342).

A client card holder agreement may be printed at the MRTT (step 344) by the receipt printer (19 of FIG. 1A). The agreement may be reviewed by the presenter, and if acceptable, may be signed by the presenter. The signed agreement may be scanned at the MRTT (step 348), in much the same way as an original check is scanned, and the image of the signature may be captured and stored in the CMD. The signature of the presenter may be captured by a signature capture pad (18 of FIG. 1A) provided at the MRTT. Alternatively, the presenter may review the card holder agreement and then sign directly on the signature capture pad. The image of the signature may be added to the card holder agreement and the entire agreement printed and provided to the presenter.

The presenter may encrypt the card with a personal identification number (PIN) (step 352) using, for example, an encrypted key pad (32 of FIG. 1B) provided at the MRTT. A transaction message, such as "Card is PINed", may then appear (step 356) on the touch-screen monitor of the MRTT.

The teller may count the cash presented and enter the amount (step 360) onto the MRTT's touch-screen monitor. A transaction message, such as "Cash Accepted", may appear on the MRTT's touch-screen monitor (step 364). At this point, the cash drawer of the MRTT may open and the cash may be placed in the cash drawer. The MRTT may also monitor the amount of cash received. This may trigger a flag, for example, on the touch-screen monitor indicating that an amount of cash should be removed from the cash drawer for deposit.

If the above steps are successful, the value of the cash may be associated with a card, and the card may be printed at the MRTT (step 368) to create a stored value card. The card may include the presenter's image, signature and biometric information. As the MRTT may be located in retail settings, the host store's advertising may also be provided on the card. A transaction message, such as "Cash Loaded to Card Account" or "Card Printed", may appear (step 372) on the touch-screen monitor of the MRTT.

A further message may appear (step 376) on the touch-screen monitor of the MRTT, such as "Any other transactions today?". At this point, the presenter may purchase money orders, make bill payments, create a family card account, or perform other transactions.

When all transactions are completed, a message may appear (step 380) on the touch-screen monitor of the MRTT, such as "Return Card to Client" or "Thank You for Your Business". The card may then be provided to the presenter. Information obtained during the transaction may be finalized and sent to the servers (step 384). At this point, the card may be available for use at an ATM or a POS terminal.

Referring to FIG. 2F, a fourth process is shown wherein a presenter presents cash to the MRTT teller to load a new value to a previously created card account.

The customer's previously printed card may be presented (step 400) to the MRTT teller. The customer may present cash to the teller to be loaded to the existing card account and associated with the card. The teller may select the appropriate action, such as "Load Check" or "Load Cash" or "Check & Cash". The card may be swiped (step 404) through a standard magnetic stripe reader provided at the MRTT, or the unique identifier associated with the card may be entered using the keyboard 24 of the MRTT. The presenter may enter the PIN (step 405) previously associated with the card. A fingerprint of the presenter may be captured and compared to the digital fingerprint encoded on the storage device associated with the card (step 406). The account information previously associated with the presenter's card may be retrieved from the servers (step 408). For security purposes, the presenter's image may be retrieved from the CMD and may appear on the touch-screen monitor of the MRTT.

The teller may count the cash and enter the amount (step 412) via the MRTT's touch-screen monitor. A transaction message, such as "Cash Accepted", may then appear (step 416) on the MRTT's touch-screen monitor. At this point, the cash drawer of the MRTT may open and the cash may be placed in the cash drawer. The MRTT may also monitor the amount of cash received. This may trigger a flag, for example, on the touch-screen monitor indicating that an amount of cash should be removed from the cash drawer for deposit.

The value of the cash may be loaded to the card account and associated with the previously printed card (step 420). A message may appear (step 424) on the touch-screen monitor of the MRTT, such as "Any other transactions today?". At this point, the presenter may purchase money orders, make bill payments, create a family card account, or perform other transactions.

When all transactions are completed, a message may appear (step 428) on the touch-screen monitor of the MRTT, such as "Return Card to Client" or "Thank You for Your Business". The card may then be provided to the presenter. Information obtained during the transaction may be finalized and sent to the servers (step 432). At this point, the card may be available for use at an ATM or a POS terminal.

Referring to FIG. 2G, a process is shown wherein a card account has previously been created. In this method, an electronic funds transfer (EFT) is transmitted to the receiving entity and is loaded to the existing card account and associated with an existing card.

An EFT may be transmitted by a third party to the pooled corporate account of the receiving entity. The EFT may be a payroll direct deposit transmitted by a payroll clerk. The customer's previously printed card may be presented (step 454) to the MRTT teller. The teller may then select the appropriate action appearing on the touch-screen monitor. The card may be swiped (step 458) through a standard magnetic stripe reader provided at the MRTT, or the unique identifier associated with the card may be entered using the keyboard 24 of the MRTT. The presenter may enter the PIN (step 460) previously associated with the card. A fingerprint of the presenter may be captured (step 462) and compared to the digital fingerprint encoded on the storage device associated with the card. The account information previously associated with the presenter's card may be retrieved from the servers (step 466). For security purposes, the account information retrieved may include an image of the presenter previously taken with the digital camera (30 of FIG. 1A). The value of the EFT may be confirmed as being received and loaded to the card account (step 470) and associated with the previously printed card. A transaction message may appear (step 474) on the touch-screen monitor of the MRTT. A further message may appear (step 478) on the touch-screen monitor of the MRTT, such as "Any other transactions today?". At this point, the presenter may purchase money orders, make bill payments, create a family card account, or perform other transactions.

When all transactions are completed, a message may appear (step 482) on the touch-screen monitor of the MRTT, such as "Return Card to Client" or "Thank You for Your Business". The card may then be provided to the presenter. Information obtained during the transaction maybe finalized and sent to the servers (step 486). At this point, the card may be available for use at an ATM or a POS terminal.

Although not depicted in the figures, an optional "Card Replacement" button may appear on the touch-screen monitor of the MRTT. This may be used to trigger certain customer identification prompts. Scanning a customer's identification could then trigger an ID match and the original account information may appear on the MRTT screen. An option to "print new card" may then be selected.

The MRTT may also monitor the amount of cash received. An accumulated amount of cash may trigger a message on the MRTT monitor to deposit a determined amount of cash in, for example, a drop safe. In this case, the teller may be prompted to open the cash drawer of the MRTT and remove the selected amount of cash. This transaction may be sent to the servers for future retrieval.

Figure 3:
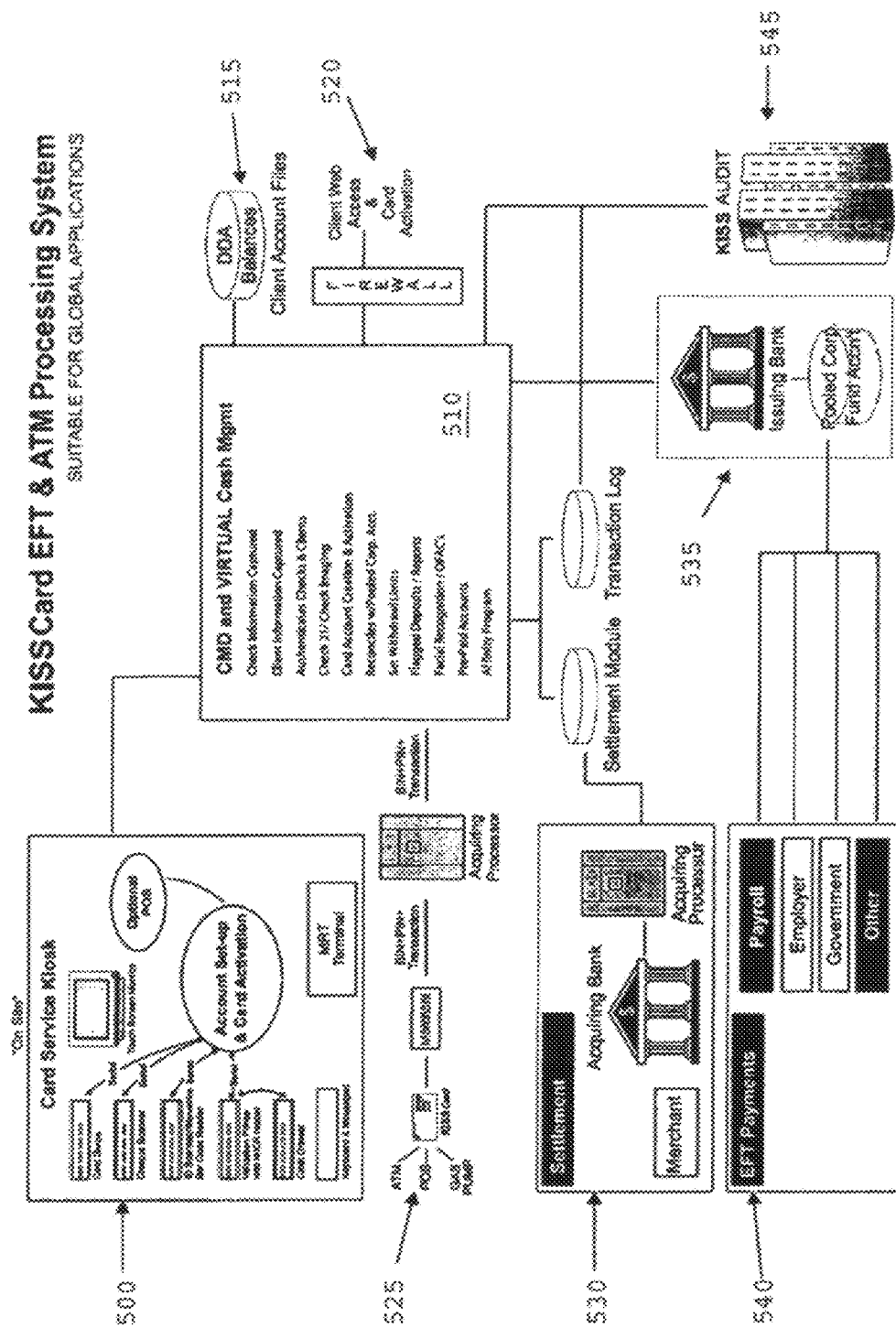
FIG. 3 is a diagram of a check processing method according to the invention.

FIG. 3 is a diagram of a check processing method according to the present invention. In that diagram it is shown that a customer may present a check or cash to an MRT terminal 500 "on site" at a bank, retail or other location for account set-up and card activation. The information gathered at the MRT terminal may be transmitted to the CMD 510. Demand deposit account (DDA) balances 515 may be obtained from the CMD via the virtual cash management system. It may also be possible for a customer to access their card account, and activate a card via the Internet 520. Once the customer is issued a card, the customer may make purchases with their card 525. Checks may be scanned at the MRT terminal and the check images may be sent to the CMD for storage after the transactions are complete at the MRTT. Settlement of the checks by financial institutions may be requested 530 through known methods. The card accounts created by the above-described processes may be held in a pooled corporate account at an issuing bank 535. EFT (electronic fund transfer) payments (e.g., direct deposits) 540 may be made to the issuing bank. Access to the CMD may also be made to conduct appropriate audits 545.

Figure 4:
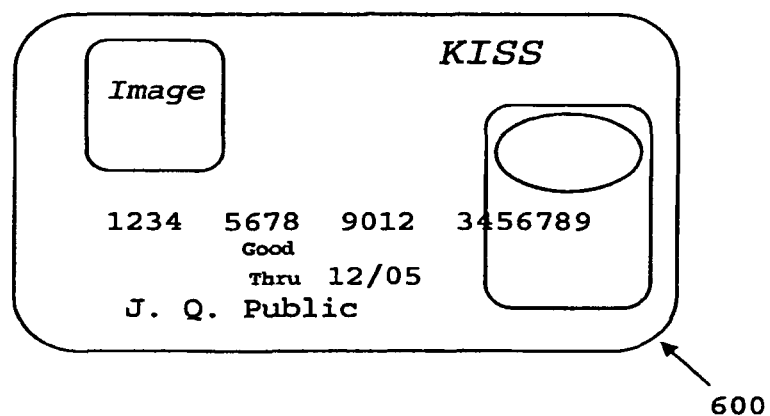
FIG. 4 shows an example of a stored value card issued to a customer.

FIG. 4 shows an example of a card 600 that may be issued to a customer.

The processes described herein are targeted for the unbanked or under-banked market. However, the system may be available for any individual to use.

While examples of the present invention have been described in detail, numerous variations, substitutions of materials, and/or modifications to design features may be made without departing from the intent or spirit of the invention. Accordingly, it is to be understood that the present invention has been described by way of illustration, and not by limitation.

What is claimed is:

1. A method, comprising:
    receiving a check from an unknown presenter at a modular retail teller terminal (MRTT), the unknown presenter not having a known bank account;
    reading a magnetic ink character recognition (MICR) line of the check;
    authenticating the check based on data read from the MICR line of the check and data acquired from the check through optical character recognition (OCR);
    populating a client management database (CMD) with the MICR line data and check writer data written on the check obtained through OCR;
    receiving an identification including identification data of the unknown presenter at the MRTT;
    authenticating an identity of the unknown presenter using the identification data;
    creating a bank account for the presenter;
    storing the identification data in the CMD such that it is associated with the bank account of the presenter; and
    setting a maximum withdrawal value for the bank account, the maximum withdrawal value based on a value of the check received from the presenter.

2. The method of claim 1, further comprising:
    electronically capturing a signature of a check writer from the check; and storing an electronic representation of the signature in the CMD.

3. The method of claim 1, further comprising:
    electronically capturing an endorsement of the check; and storing an electronic representation of the endorsement in the CMD.

4. The method of claim 1, wherein authenticating the check includes verifying that a bank account of an issuer of the check exists.

5. The method of claim 2, wherein authenticating the check includes:
   verifying that an account number on the check is associated with a bank branch identified by a routing number on the check; and
   verifying that an address of the bank on the check is correct.

6. The method of claim 1, wherein authenticating of the identity of the unknown presenter includes comparing the identification data with data stored in a third party database.

7. The method of claim 1, further comprising:
   obtaining a biometric sample from the presenter;
   encoding an electronic representation of the biometric sample on a card, the card being associated with the bank account of the presenter; and
   presenting the card to the presenter.

8. The method of claim 7, wherein the biometric sample is one of a digital image or a digital fingerprint of the presenter, and wherein an electronic representation of the biometric sample is stored in the CMD such that it is associated with the bank account of the presenter.

9. The method of claim 7, further comprising:
   presenting a card holder agreement to the presenter;
   receiving a signature of the presenter;
   storing an electronic representation of the signature of the presenter in the CMD such that the signature is associated with the bank account of the presenter; and
   presenting the card associated with the bank account to the presenter.

10. The method of claim 1, wherein the check writer data written on the check includes a name of the check writer and an address of the check writer.

11. The method of claim 10, wherein the MRTT uses OCR to read the check writer data written on the check.

12. The method of claim 5, wherein each of the steps of the method is performed in real time.

13. A method of creating a bank account at a modular retail teller terminal (MRTT) for an unknown presenter of a check, the unknown presenter not having a known bank account, the method comprising:
   reading a magnetic ink character recognition (MICR) line of the check at the MRTT;
   performing optical character recognition (OCR) on the check to identify an address and an identity of the check writer;
   authenticating the check based-on a routing number and an account number read from the MICR line of the check and the address and identity of the check writer acquired through OCR;
   storing the routing number, the account number, and the identity and address of the check writer in a client management database (CMD);
   receiving an identification including identification data of the unknown presenter at the MRTT;
   authenticating an identity of the unknown presenter;
   creating a bank account for the unknown presenter;
   storing the identification data in the CMD such that it is associated with the bank account of the presenter:
   setting a maximum withdrawal value for the bank account, the maximum withdrawal value associated with a value of the check presented by the presenter;
   encrypting a card associated with the bank account with a personal identification number (PIN) received from the presenter; and,
   presenting the card associated with the bank account to the presenter.

14. The method of claim 13, further comprising:
   presenting a card holder agreement to the presenter;
   receiving a signature of the presenter; and
   storing an electronic representation of the signature of the presenter in the CMD such that the signature is associated with the bank account of the presenter.

15. The method of claim 13, further comprising:
   electronically capturing a signature of the check writer from the check; and
   storing an electronic representation of the signature of the check writer in the CMD.

16. The method of claim 13, further comprising:
   electronically capturing an endorsement of the check; and
   storing an electronic representation of the endorsement in the CMD.

17. The method of claim 13, wherein authenticating the check includes verifying that an account number on the check is associated with a bank branch identified by a routing number on the check.

18. The method of claim 13, further comprising:
   obtaining a biometric sample from the presenter; and
   storing an electronic representation of the biometric sample in the CMD such that it is associated with the bank account of the presenter.

19. The method of claim 18, wherein the biometric sample is one of a digital image or a digital fingerprint of the presenter.

20. The method of claim 17, wherein authentication of the check is performed in real time.

* * * * *